UNITED STATES PATENT OFFICE.

FRIEDRICH KÖHLER, OF LUDWIGSHAFEN AM RHEIN, ASSIGNOR TO BADISCHE ANILIN AND SODA FABRIK, OF BADEN, GERMANY.

DYE-STUFF OR COLORING-MATTER.

SPECIFICATION forming part of Letters Patent No. 224,927, dated February 24, 1880.

Application filed January 7, 1880.

*To all whom it may concern:*

Be it known that I, FRIEDRICH KÖHLER, of Ludwigshafen am Rhein, Empire of Germany, have invented a new and useful Improvement in Dye-Stuffs or Coloring-Matters, which invention is fully described in the following specification.

This invention relates to a red coloring-matter or dye-stuff suitable for dyeing and printing, which may be termed "fast crimson-bluish shade," and which is capable of replacing certain shades of cochineal or similar dyes in some of their industrial applications.

This coloring-matter belongs to the class of the so-called "azo compounds," and results from the action of the diazo compound of the hereinafter-described sulpho-acid of amido-azo benzole upon an alkaline solution of a bisulpho-acid of beta-naphthol.

In preparing the sulpho-acid of amido-azo benzole, I mix ten parts of amido-azo benzole and forty parts of fuming sulphuric acid containing from twenty to twenty-five per cent. of anhydrous sulphuric acid, and heat this mixture during about nine hours to 60° centigrade, then pour it afterward in water, and add slaked lime, and afterward soda, and obtain, in a manner well-known to chemists, the sodium salt of the sulpho-acid of amido-azo benzole. I then dissolve ten parts of the sodium salt of the sulpho-acid of amido-azo benzole, obtained as above described, in about fifty parts of water, and to this solution I add fifteen parts of muriatic acid of a specific gravity of about 1.16 to 1.17; and I further add, gradually, about eighteen parts of a fifteen per cent. solution of nitrate of sodium until the sulpho-acid of amido-azo benzole is transformed into its diazo-compound, which is termed, in chemical language, "the sulpho-acid of diazo-azo benzole." This solution of the sulpho-acid of diazo-azo benzole is gradually mixed with an alkaline solution of bisulpho-acid of beta-naphthol, which is prepared by dissolving thirty-five parts of the sodium salt of said bisulpho-acid and six parts of caustic soda in two hundred parts of water, care being taken to maintain the mixture always alkaline.

From this mixture my new dye-stuff or coloring-matter is precipitated in the form of a brownish paste, which is subsequently filtered, pressed, and dried, when it is ready for use.

My new dyestuff is soluble in hot water, and it dyes wool in an acidulated bath.

What I claim as new, and desire to secure by Letters Patent, is—

As a new manufacture, the bluish-red coloring-matter produced by the action of the sulpho-acid of diazo-azo benzole upon an alkaline solution of a bisulpho-acid of beta-naphthol, substantially as described, or by any other means which will produce a like result.

In testimony that I claim the foregoing I have hereunto set my hand and seal this 10th day of December, 1879.

FRIEDRICH KÖHLER. [L. S.]

Witnesses:
   C. GLASER,
   A. HANSER.